(12) United States Patent
Starukhin et al.

(10) Patent No.: US 11,315,055 B2
(45) Date of Patent: Apr. 26, 2022

(54) SYSTEM AND METHOD FOR VISUALIZING AN ORDER ALLOCATION PROCESS

(71) Applicant: salesforce.com, inc., San Francisco, CA (US)

(72) Inventors: Michael Starukhin, Parkland, FL (US); Richard Farah, Coconut Creek, FL (US)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 16/046,511

(22) Filed: Jul. 26, 2018

(65) Prior Publication Data

US 2020/0034767 A1 Jan. 30, 2020

(51) Int. Cl.
*G06Q 10/06* (2012.01)
*G06F 3/0484* (2022.01)
*G06N 5/02* (2006.01)

(52) U.S. Cl.
CPC ..... *G06Q 10/06315* (2013.01); *G06F 3/0484* (2013.01); *G06N 5/02* (2013.01)

(58) Field of Classification Search
CPC ............. G06Q 10/06316; G06Q 10/0633
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

FOREIGN PATENT DOCUMENTS

| | | | | |
|---|---|---|---|---|
| CN | 111985674 A | * | 11/2020 | .......... G06T 11/206 |
| WO | WO-2009046095 A1 | * | 4/2009 | .......... G06T 11/206 |

OTHER PUBLICATIONS

Rick Siow Mong, RiskVis: Supply Chain Visualization with Risk Management and Real-time Monitoring, 2013 IEEE International Conference on Automation Science and Engineering (CASE).*

*Primary Examiner* — Jerry O'Connor
*Assistant Examiner* — Philip N Warner
(74) *Attorney, Agent, or Firm* — LKGlobal | Lorenz & Kopf, LLP (57) ABSTRACT

A computer-implemented method in a visualization module is provided. The visualization module comprises a processor configured by programming instructions encoded in non-transient computer readable media. The method comprises: receiving, by the processor from a user interface, a request for a visualization of decision steps made in an order allocation process; retrieving, by the processor from a database system, a plurality of data items belonging to the same order that identify rules applied at each decision step in the order allocation process, parameters used during rule application, and decisions resulting from rule application; generating, by the processor using the retrieved data items, a visualization that identifies the decision made at each decision step; and causing the visualization to be displayed on the user interface.

18 Claims, 5 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,350,561 B1 * | 5/2016 | Schafer .................. H04L 41/04 |
| 9,779,375 B2 * | 10/2017 | Grabovski ....... G06Q 10/06311 |
| 9,870,629 B2 * | 1/2018 | Cardno .................. G06Q 10/10 |
| 10,467,559 B1 * | 11/2019 | Svenson .............. G06Q 20/209 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0154606 A1 * | 7/2005 | Terzidis ................. G06Q 99/00 |
| | | 715/853 |
| 2006/0021019 A1 | 1/2006 | Hinton et al. |
| 2008/0029595 A1 * | 2/2008 | Waller ................. G06Q 10/087 |
| | | 235/383 |
| 2008/0120129 A1 * | 5/2008 | Seubert .................. G06Q 10/10 |
| | | 705/35 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0262521 A1 * | 10/2010 | Robinson ............... G06Q 10/08 |
| | | 705/29 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

(56) References Cited

U.S. PATENT DOCUMENTS

| | | | | |
|---|---|---|---|---|
| 2014/0330579 | A1* | 11/2014 | Cashman | E04H 1/1222 |
| | | | | 705/2 |
| 2015/0046298 | A1* | 2/2015 | Zwakhals | G06Q 10/087 |
| | | | | 705/28 |
| 2015/0178835 | A1* | 6/2015 | Quillian | G06Q 40/04 |
| | | | | 705/37 |
| 2015/0348282 | A1* | 12/2015 | Gibbon | G06Q 10/06315 |
| | | | | 382/103 |
| 2016/0171439 | A1* | 6/2016 | Ladden | G06Q 10/0832 |
| | | | | 705/340 |
| 2016/0180274 | A1* | 6/2016 | Zwakhals | G06Q 10/087 |
| | | | | 705/7.25 |
| 2017/0039500 | A1* | 2/2017 | Leidner | G06F 16/951 |
| 2017/0329506 | A1* | 11/2017 | Laetham | G06T 11/60 |
| 2017/0369245 | A1* | 12/2017 | Suemitsu | G06Q 10/083 |
| 2018/0091647 | A1* | 3/2018 | Elizondo | H04M 3/22 |
| 2018/0096273 | A1* | 4/2018 | Arnott | G06Q 10/06316 |
| 2018/0174250 | A1* | 6/2018 | Faulkner | G06F 3/04842 |
| 2018/0225609 | A1* | 8/2018 | Napoli | G06Q 10/06316 |
| 2019/0171989 | A1* | 6/2019 | Smith | G06F 16/25 |
| 2019/0205792 | A1* | 7/2019 | Huang | G06N 20/00 |
| 2019/0354275 | A1* | 11/2019 | Louie | G06F 3/0484 |
| 2020/0026397 | A1* | 1/2020 | Wohlstadter | G06F 3/0482 |

* cited by examiner

SYSTEM AND METHOD FOR VISUALIZING AN ORDER ALLOCATION PROCESS

TECHNICAL FIELD

Embodiments of the subject matter described herein relate generally to computer systems, and more particularly to order management systems implemented via a computer system.

BACKGROUND

When a customer places an order, an order management system may be employed to manage the process of allocating goods to the order. Order allocation can include the process of locating inventory for an order and making decisions to pick that inventory. Orders can be allocated from incoming stock and/or from existing inventory on hand from one or multiple sites. A number of decisions may be made to fill an order and the decisions may be made based on various parameters and the application of various rules to the parameters.

An example order allocation process may include: (1) receiving order information from a host business system; (2) prioritizing orders for allocation; (3) reviewing order attributes (or parameters) to determine whether the order: (a) must be shipped from one facility; (b) should be filled from one site if possible; otherwise, filled from multiple sites; or (c) can only be shipped if the entire order is allocated (may be allocated from multiple facilities); (4) reviewing the postal code on the order's ship-to address to identify predetermined geographic locations from which inventory can be allocated for the order; and (5) attempting to allocate from a site that has the highest priority. A site chosen to fill an order may have enough inventory available to fill the order, and the order can be filled from the site. The chosen site may have some inventory available but not enough to fill the order, and various sourcing rules may need to be applied to determine how the order will be filled. If sourcing rules allow splitting an order across multiple sites, then the order can be partially filled at multiple sites. If sourcing rules do not allow splitting an order, then another site may need to be chosen or the order placed in a backorder status. If no inventory is available at a chosen site, then another site may need to be chosen. If no inventory is available at any site, then an order exception, such as placing the order in a backorder status, may occur.

The allocation process is typically a blackbox wherein users do not know how the decisions were made to fill the order. A user, however, may want to know how the decisions were made to fill the order.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Disclosed herein are systems and methods for visualizing an order allocation process. The subject matter described herein discloses apparatus, systems, techniques and articles for recording, in a database, data items identifying decisions, rules, and other parameters used in an order allocation process. The data items can be retrieved from the database and one or more visualizations generated that described the various steps in the order allocation process, the decisions made, the rules applied, and the parameters considered during rule application.

Figure 1:
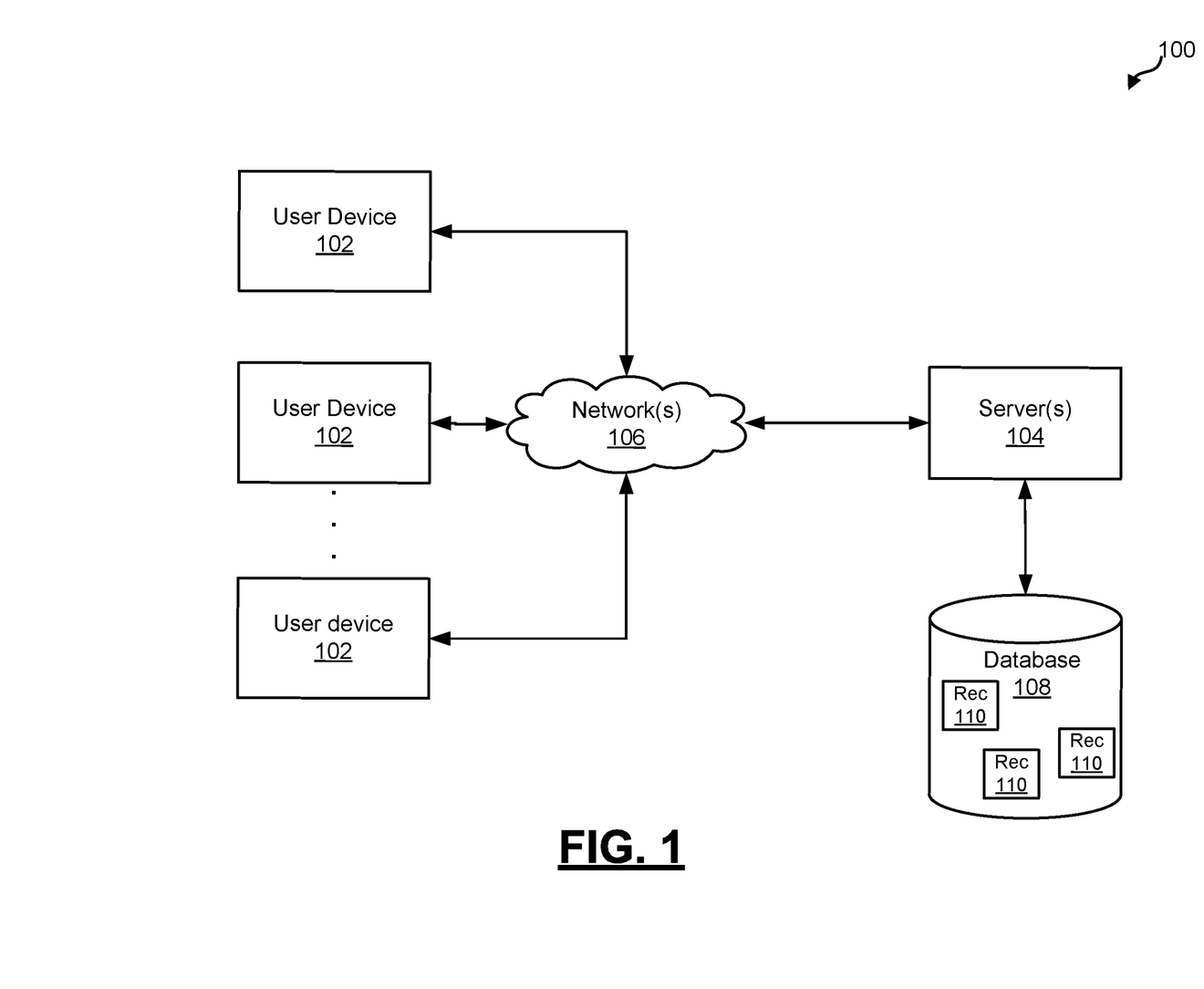
FIG. 1 is a block diagram depicting an example computing environment that can be used to implement aspects of the current subject matter, in accordance with some embodiments.

FIG. 1 is a block diagram depicting an example computing environment 100 that can be used to implement aspects of the current subject matter. The example system includes one or more user or client devices 102 (e.g., computers) that communicate with one or more servers 104 via one or more networks 106. The server 104 is coupled to a database 108 that may store records 110 that include information relating to an order. The client device 102 may initiate a visualization application that executes on the client device 102 (e.g., client-side application) or an instance of a visualization application that executes on the server 104 via a web interface (e.g., server-side application) to retrieve records 110 stored in the database 108 and generate one or more visualizations that described the various steps in an order allocation process, the decisions made, the rules applied, and the parameters considered during rule application. The database 108 may include any of a number of different types of databases including but not limited to a NOSQL database and others.

Figure 2:
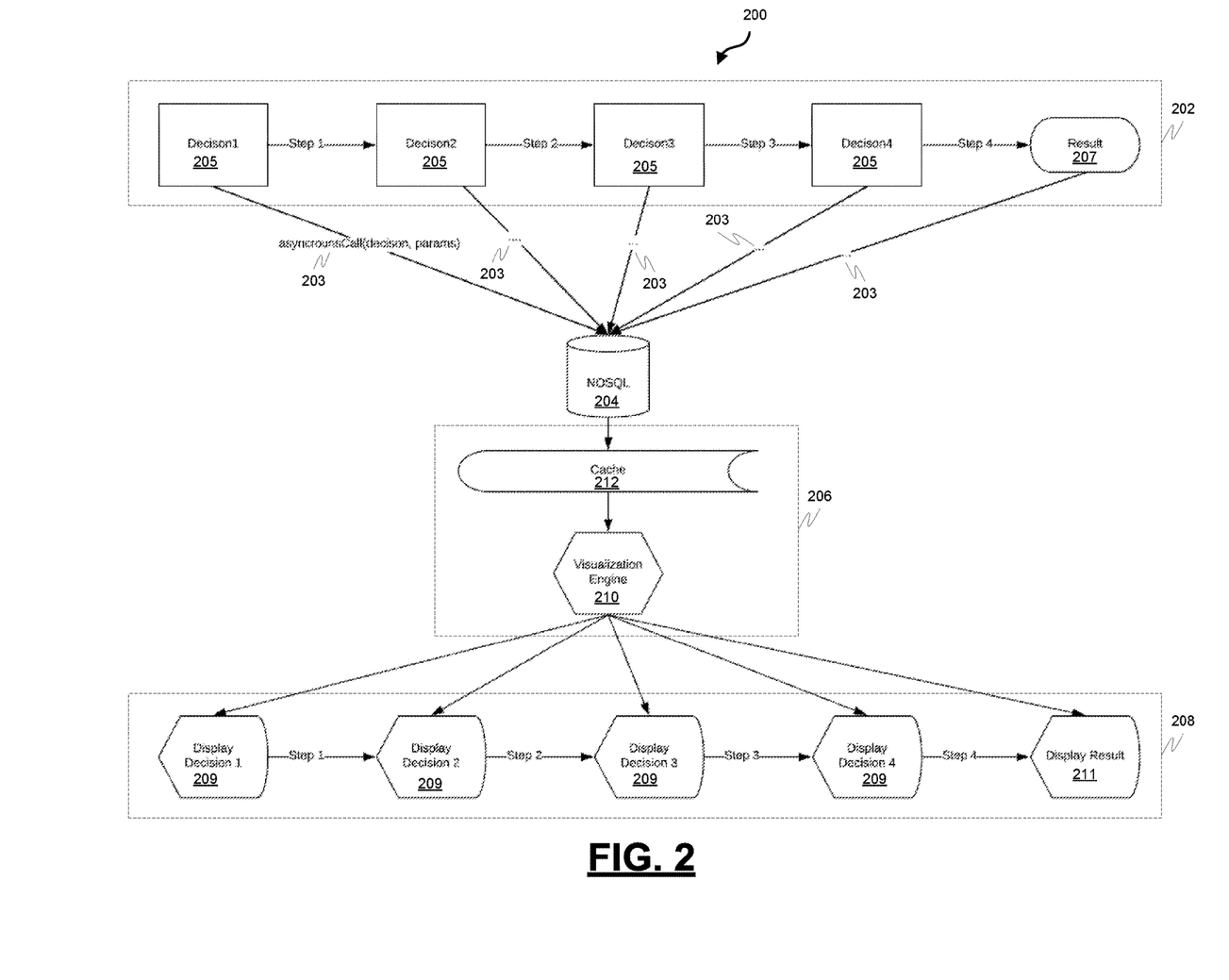
FIG. 2 is a block diagram depicting an example computing environment in which a visualization system may be implemented, in accordance with some embodiments.

FIG. 2 is a block diagram depicting an example computing environment 200 in which a visualization system may be implemented. The example computing environment 200 includes an allocation system 202 that is configured to execute an order allocation process, an external system having a database 204 (e.g., a NOSQL database) configured to store data regarding the order allocation process, and a visualization system 206 configured to retrieve the data regarding the order allocation process from the database 204 and generate visualizations 208 that describe the order allocation process.

In one example operating scenario of the example computing environment 200, as the allocation system 202 is executing an order allocation process and making decisions based on rules/algorithms, the allocation system 202 causes each decision to be recorded asynchronously to the database 204. The example allocation system 202 is configured to record inventory level, geographical considerations, rules defined by the client, and any other decisions made during the allocation process with enough parameters to precisely describe the actions that transpired. The example allocation system 202 is configured to record these parameters in real time, (e.g., using an asynchronous call 203), for each step in an order allocation process for every order processed by the allocation system 202.

When a retailer/client has a question about an order processed by the allocation system 202, the visualization system 206 can allow the retailer/client to graphically view information regarding the allocation of that order. A visualization engine 210 in the visualization system 206 is configured to retrieve data stored in the database 204 regarding the order, temporary store the data in a cache 212, generate one or more visualizations 208 that can be displayed in a GUI (graphical user interface) and that are configured to display the decisions made, rules applied, and other parameters relating to the decisions in the same order in which the decisions were made during the allocation process.

As depicted, the visualization engine 210 is configured to map each of the decisions 205 and the result 207 in the allocation processes to a visualization 209, 211 of that event. For example, if the allocation process has a rule that requires shipment from the closest location, the visualization may show the three closest warehouses and display why it chose the selected warehouse. The example visualization engine 210 is configured to provide a user with the ability to drill into all steps of the allocation process and view all details of the decision.

Figure 3:
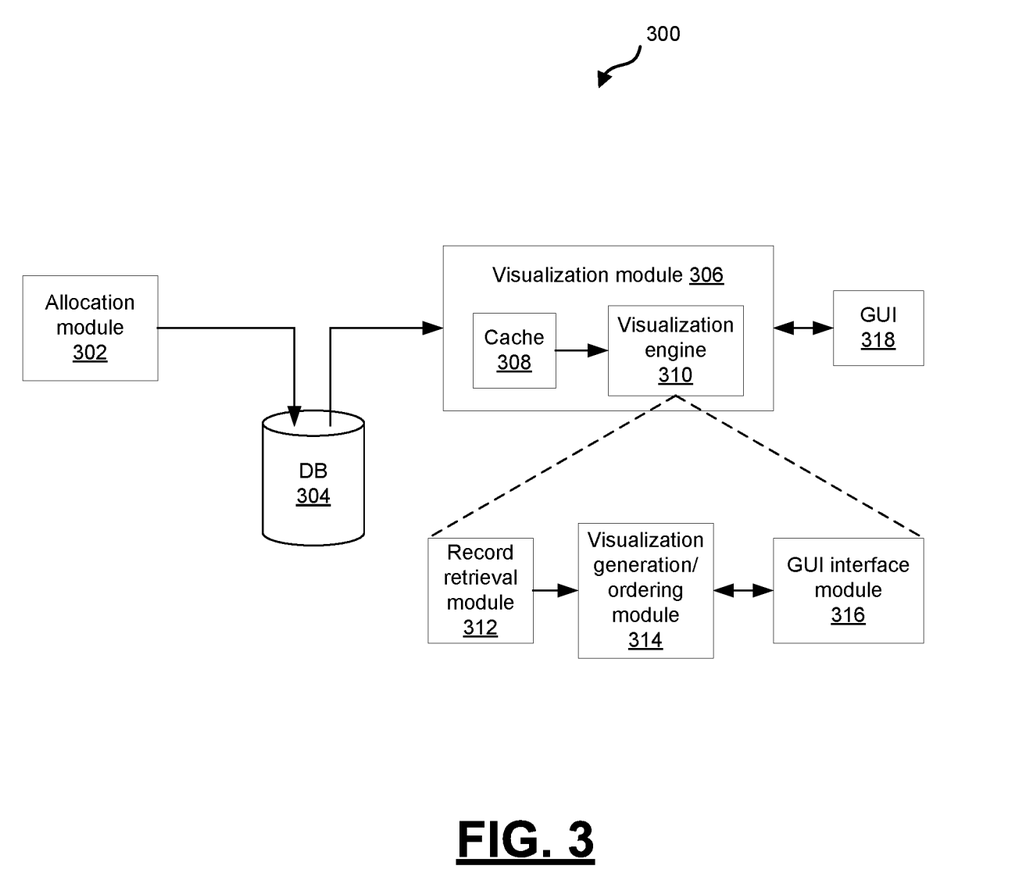
FIG. 3 is a block diagram depicting an example computing system that implements a visualization module that is configured to provide one or more visualizations of an order allocation process, in accordance with some embodiments.

FIG. 3 is a block diagram depicting an example computing system 300 that implements a visualization module 306 that is configured to provide one or more visualizations of an order allocation process. The example computing system 300 includes an allocation module 302, a database system 304, and a visualization module 306. The example allocation module 302 is configured to perform an order allocation process to process a customer order. While processing the order, the example allocation module 302 may make a number of decisions, the end result of which will be the completion of the order process. During the performance of the order allocation process, the example allocation module 302 is configured to record data records containing decisions made, rules followed in making the decisions, and parameters considered during application of the rules in the database system 304.

The example visualization module 306 is configured to retrieve data stored in the database 304 regarding an order allocation process, temporary store the data in a cache 308, generate one or more visualizations that can be displayed in a GUI 318 and that are configured to display the decisions made, rules applied, and other parameters relating to the decisions in the same order in which the decisions were made during the order allocation process. The example visualization module 306 includes the cache 308 and a visualization engine 310. The example cache is configured for use in storing retrieved data records regarding an order allocation process. The example visualization engine 310 includes a record retrieval module 312, a visualization generation and ordering module 314, and a GUI interface module 316.

The example visualization engine 310 is implemented by a controller. The controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in implementing the visualization engine 310.

The instructions may include one or more separate programs, each of which comprises an ordered listing of executable instructions for implementing logical functions. The instructions, when executed by the processor, receive and process data, perform logic, calculations, methods and/or algorithms for implementing the visualization engine 310.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

The example record retrieval module 312 is configured to retrieve, from the database system 304, a plurality of data items related to the same order that identify rules applied at each decision step in the order allocation process, parameters used during rule application, and decisions resulting from rule application. The example record retrieval module 312, may choose a plurality of data items related to the same order, for example, by choosing data items having the same order number as a parameter. The example record retrieval module 312 is configured to store (at least temporarily) the retrieved data items in the cache 308 so that the visualization engine 310 may generate visualizations from the data items stored in the cache 308.

The example visualization generation and ordering module 314 is configured to generate, using the retrieved data items, a visualization that identifies the decision made at each decision step. The visualization may include a summary visualization wherein the summary visualization may summarize the decisions made at the various steps. The summary visualization may also include a plurality of visualization links for selection via the GUI 318, wherein each visualization link, when selected, is configured to cause the selection of one of a plurality of decision-specific visualizations. This may allow a user to drill into various steps of the allocation process and view details of decisions. Each decision-specific visualization is associated with a unique decision step and configured to identify the decision made at the associated decision step, the rule applied at the associated decision step, and the parameters considered during rule application at the associated decision step. The example visualization generation and ordering module 314 is configured to generate the summary visualization and the plurality of decision-specific visualizations responsive to the request for a visualization. Alternatively or in addition, the example visualization generation and ordering module 314 may be configured to generate a decision-specific visualization associated with a unique decision step in response to selection of a visualization link associated with the unique decision step and not before selection of the associated visualization link.

The example visualization generation and ordering module 314 is configured to arrange (e.g., based on a time stamp or decision identifier) the decisions on the summary visualization in the order in which the decisions were made during the order allocation process. For decision-specific visualizations, the example visualization generation and ordering module 314 is configured to include in decision-specific visualizations a visualization link to a decision-specific visualization associated with an immediately preceding decision step and a visualization link to a decision-specific visualization associated with an immediately following decision step. This may allow a user to step forward and back through decision-specific visualizations in the order in which the associated decisions were rendered.

The example GUI interface module 316 is configured to receive, from the GUI 318, a request for a visualization of decision steps made in an order allocation process and, in response, to cause the visualization engine 310 to generate the requested visualization. After visualization generation, the example GUI interface module 316 is configured to send and cause the generated visualization to be displayed on the GUI 318. When a user-specific visualization is selected via the GUI 318, the example GUI interface module 316 is configured to send and cause the selected user-specific visualization to be displayed on the GUI 318 in response to selection of a visualization link associated with the user-specific visualization.

Figure 4:
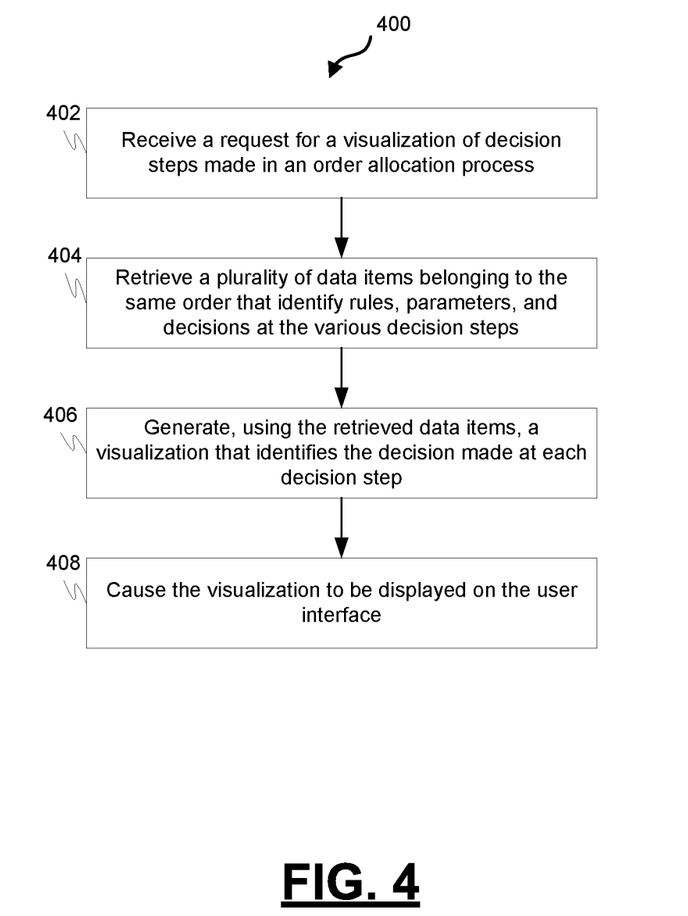
FIG. 4 is a process flow chart depicting an example process in a visualization module, in accordance with some embodiments.

FIG. 4 is a process flow chart depicting an example process 400 in a visualization module. The order of operation within the example process 400 is not limited to the sequential execution as illustrated in the figure, but may be performed in one or more varying orders as applicable and in accordance with the present disclosure.

The example process includes receiving, by the processor from a user interface, a request for a visualization of decision steps made in an order allocation process (operation 402). The request may be made via a user interface such as a GUI on a user device and sent over a network to a visualization engine that is configured to retrieve order allocation process data and generate visualizations from the data.

The example process includes retrieving, by the processor from a database system, a plurality of data items belonging to the same order (e.g., having the same order number) that identify rules applied at each decision step in the order allocation process, parameters used during rule application, and decisions resulting from rule application (operation 404). The retrieving may include temporarily storing the data items in a cache and retrieving the data items from the cache as needed.

The example process includes generating, by the processor using the retrieved data items, a visualization that identifies the decision made at each decision step (operation 406). The visualization may comprise a summary visualization and the summary visualization may summarize the decisions made at the various steps. The summary visualization may further include a plurality of visualization links for selection via the user interface, wherein each visualization link, when selected, is configured to cause the selection of one of a plurality of decision-specific visualizations. This may allow a user to drill into various steps of the allocation process and view details of decisions. Each decision-specific visualization is associated with a unique decision step and configured to identify the decision made at the associated decision step, the rule applied at the associated decision step, and the parameters considered during rule application at the associated decision step. The summary visualization and the plurality of decision-specific visualizations may be generated responsive to the request for a visualization. Alternatively or in addition, a decision-specific visualization associated with a unique decision step may be generated in response to selection of a visualization link associated with the unique decision step and not before selection of the associated visualization link. The decisions on the summary visualization may be arranged in the order in which the decisions were made during the order allocation process. Decision-specific visualizations may include a visualization link to a decision-specific visualization associated with an immediately preceding decision step and a visualization link to a decision-specific visualization associated with an immediately following decision step. This may allow a user to step forward and back through decision-specific visualizations in the order in which the associated decisions were rendered.

The example process includes causing the visualization to be displayed on the user interface (operation 408). After visualization generation, the generated visualization can be sent for display on a user interface. When a user-specific visualization is selected via the user interface, the selected user-specific visualization is sent for display on the user interface in response to selection of a visualization link associated with the user-specific visualization.

Figure 5:
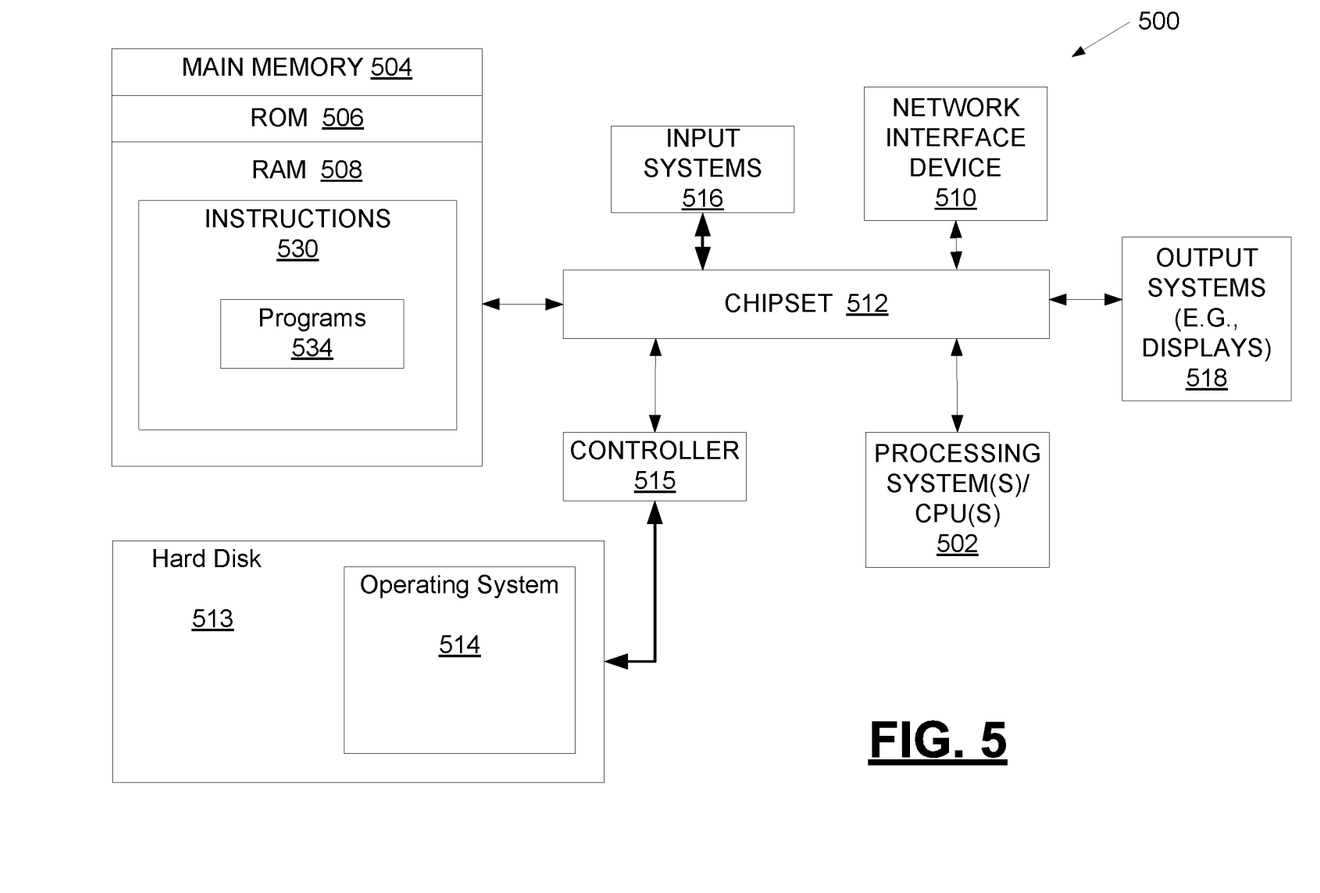
FIG. 5 is a schematic block diagram of an example computer system that can be used to implement the techniques and methods described herein, in accordance with some embodiments.

FIG. 5 is a schematic block diagram of an example computer system that can be used to implement the techniques and methods described herein. The example computer system can include one or more processing system(s) 502, main memory 504, a network interface device (NID) 510, a chipset 512, a hard disk 513 and hard disk controller 515, input systems 516, and output systems 518.

The chipset 512 is usually located on a motherboard and is a set of electronic components (e.g., in an integrated circuit) that interconnects and manages the data flow between the processing system(s) 502 and other elements of the computer system and connected peripherals. For instance, the chipset 512 provides an interface between the processing system(s) 502 and the main memory 504, and also includes functionality for providing network connectivity through the NID 510, such as a gigabit Ethernet adapter. The chipset 512 typically contains the processor bus interface (also known as a front-side bus), memory controllers, bus controllers, I/O controllers, etc.

Processing system(s) 502 represents one or more general-purpose processing devices such as a microprocessor, central processing unit, or the like. More particularly, the processing system(s) 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 502 may also be one or more special-purpose processing devices such as an application specific integrated circuit (ASIC), a field programmable gate array (FPGA), a digital signal processor (DSP), network processor, or the like.

The processing system(s) 502 can include one or more central processing units (CPUs) that operate in conjunction with the chipset 512. The processing system(s) 502 perform arithmetic and logical operations necessary for the operation of the example computer system.

The NID 510 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 516 (or input device(s)) allow a user to input information to the computer system and can include things such as a keyboard, a mouse or other cursor pointing device, a pen, a voice input device, a touch input device, a webcam device, a microphone, etc. Output system(s) 518 (or output device(s)) present information to the user of the computer system and can include things such as a display, monitor, speakers, or the like.

The chipset 512 can provide an interface to various forms of computer-readable storage media including a main memory 504 (e.g., read-only memory (ROM), flash memory, dynamic random access memory (DRAM) such as synchronous DRAM (SDRAM)), and hard disk 513. The processing system(s) 502 can communicate with the various forms of computer-readable storage media via the chipset 512 and appropriate buses.

A hard disk 513 is a form of non-volatile memory that can store an operating system (OS) 514. The operating system 514 is software that is copied into RAM and executed by the processing system(s) 502 to control the operation of the example computer system, manage computer hardware and software resources, and provide common services for computer programs executed by the processing system(s) 502. Regardless of the implementation, the operating system 514 includes many different "components" that make the different parts of the example computer system work together. The disk controller 515 is the controller circuit which enables the processing system 502 to communicate with a hard disk 513, and provides an interface between the hard disk 513 and the bus connecting it to the rest of the system.

The main memory 504 may be composed of many different types of memory components. The main memory 504 can include non-volatile memory (such as read-only memory (ROM) 506, flash memory, etc.), volatile memory (such as random access memory (RAM) 508), or some combination of the two. The RAM 508 can be any type of suitable random access memory including the various types of dynamic random access memory (DRAM) such as SDRAM, the various types of static RAM (SRAM). The main memory 504 (as well as the processing system(s) 502) may be distributed throughout the example computer system.

The ROM 506 of the main memory 504 can be used to store firmware that includes program code containing the basic routines that help to start up the example computer system and to transfer information between elements within the example computer system. The ROM of the main memory 504 may also store other software components necessary for the operation of the example computer system.

The RAM 508 stores programs/instructions 530 or executable code for one or more programs 534 that can be loaded and executed at processing system(s) 502 to perform various functions. The programs/instructions 530 are computer readable program code that can be stored in RAM 508 (or other a non-transitory computer readable medium of the example computer system) that can be read and executed by processing system(s) 502 to perform various acts, tasks, functions, and steps as described herein. The methods and techniques described herein can be captured in programming instructions 530 for execution by the processing system 502 to cause the example computer system to perform the described methods, processes, and techniques.

The subject matter described herein discloses apparatus, systems, techniques and articles for visualizing an order allocation process. The subject matter described herein discloses apparatus, systems, techniques and articles for recording data items identifying decisions, rules, and other parameters used in an order allocation process in a database. The data items can be retrieved from the database and one or more visualizations generated that described the various steps in the order allocation process, the decisions made, the rules applied, and the parameters considered during rule application.

In one embodiment, a computer-implemented method in a visualization module is provided. The visualization module comprises a processor configured by programming instructions encoded in non-transient computer readable media. The method comprises: receiving, by the processor from a user interface over a network, a request for a visualization of decision steps made in an order allocation process, wherein the order allocation process involves an order of goods by a customer from a merchant and the determination of the location from which the goods ordered by the customer will ship to fulfil the order; retrieving, by the processor from a database system, a plurality of data items belonging to the same order that identify rules applied at each decision step in the order allocation process, parameters used during rule application, and decisions resulting from rule application, wherein the data items have been stored asynchronously in the database during execution of the order allocation process at or near the time decisions were made in the order allocation process and the data items include an identification of inventory level, geographical considerations, and rules defined by the merchant; generating, by the processor using the retrieved data items, a visualization that identifies the decision made at each decision step, wherein the visualization comprises a summary visualization that summarizes the decisions made and includes a plurality of visualization links for selection via the user interface, wherein each visualization link, when selected, is configured to cause the selection of one of a plurality of decision-specific visualizations, wherein each decision-specific visualization is associated with a unique decision step and configured to identify the decision made at the associated decision step, the rule applied at the associated decision step, and the parameters considered during rule application at the associated decision step; and causing the visualization to be displayed on the user interface.

These aspects and other embodiments may include one or more of the following features. The generating a visualization may comprise generating the summary visualization and the plurality of decision-specific visualizations in response to receiving a request for a visualization of decision steps. The causing the visualization to be displayed may further comprise causing a decision-specific visualization to be displayed in response to selection of a visualization link associated with the decision-specific visualization. The method may further comprise generating a decision-specific visualization associated with a unique decision step in response to selection of a visualization link associated with the unique decision step. The method may further comprise arranging, by the processor, the decisions on the summary visualization in the order in which the decisions were made during the order allocation process. A first decision-specific visualization may include a visualization link to a decision-specific visualization associated with an immediately preceding decision step and a visualization link to a decision-specific visualization associated with an immediately following decision step. The method may further comprise storing the data items in a cache and wherein the generating, by the processor using the retrieved data items, a visualization may comprise retrieving the data items from the cache.

In another embodiment, a visualization module comprising a processor configured by programming instructions encoded in non-transient computer readable media is provided. The visualization module is configured to: receive, from a user interface, a request for a visualization of decision steps made in an order allocation process, wherein the order allocation process involves an order of goods by a customer from a merchant and the determination of the location from which the goods ordered by the customer will ship to fulfil the order; retrieve, from a database system, a plurality of data items belonging to the same order that identify rules applied at each decision step in the order allocation process, parameters used during rule application, and decisions resulting from rule application, wherein the data items have been stored asynchronously in the database during execution of the order allocation process at or near the time decisions were made in the order allocation process and the data items include an identification of inventory level, geographical considerations, and rules defined by the merchant; generate, using the retrieved data items, a visualization that identifies the decision made at each decision step, wherein the visualization comprises a summary visualization that summarizes the decisions made and includes a plurality of visualization links for selection via the user interface, wherein each visualization link, when selected, is configured to cause the selection of one of a plurality of decision-specific visualizations, wherein each decision-specific visualization is associated with a unique decision step and configured to identify the decision made at the associated decision step, the rule applied at the associated decision step, and the parameters considered during rule application at the associated decision step; and cause the visualization to be displayed on the user interface.

These aspects and other embodiments may include one or more of the following features. The visualization module may be configured to generate the summary visualization and the plurality of decision-specific visualizations responsive to the request for a visualization. The visualization module may be configured to cause a decision-specific visualization to be displayed in response to selection of a visualization link associated with the decision-specific visualization. The visualization module may be configured to generate a decision-specific visualization associated with a unique decision step in response to selection of a visualization link associated with the unique decision step. The visualization module may be configured to arrange the decisions on the summary visualization in the order in which the decisions were made during the order allocation process. A first decision-specific visualization may include a visualization link to a decision-specific visualization associated with an immediately preceding decision step and a visualization link to a decision-specific visualization associated with an immediately following decision step. The visualization module may be configured to store the data items in a cache and generate the visualization from the data items stored in the cache.

In another embodiment, a non-transitory computer readable storage medium embodying programming instructions configurable to perform a method is provided. The method comprises: receiving, by the processor from a user interface, a request for a visualization of decision steps made in an order allocation process, wherein the order allocation process involves an order of goods by a customer from a merchant and the determination of the location from which the goods ordered by the customer will ship to fulfil the order; retrieving, by the processor from a database system, a plurality of data items belonging to the same order that identify rules applied at each decision step in the order allocation process, parameters used during rule application, and decisions resulting from rule application, wherein the data items have been stored asynchronously in the database during execution of the order allocation process at or near the time decisions were made in the order allocation process and the data items include an identification of inventory level, geographical considerations, and rules defined by the merchant; generating, by the processor using the retrieved data items, a visualization that identifies the decision made at each decision step, wherein the visualization comprises a summary visualization that summarizes the decisions made and includes a plurality of visualization links for selection via the user interface, wherein each visualization link, when selected, is configured to cause the selection of one of a plurality of decision-specific visualizations, wherein each decision-specific visualization is associated with a unique decision step and configured to identify the decision made at the associated decision step, the rule applied at the associated decision step, and the parameters considered during rule application at the associated decision step; and causing the visualization to be displayed on the user interface.

These aspects and other embodiments may include one or more of the following features. These aspects and other embodiments may include one or more of the following features. The generating a visualization may comprise generating the summary visualization and the plurality of decision-specific visualizations in response to receiving a request for a visualization of decision steps. The causing the visualization to be displayed may further comprise causing a decision-specific visualization to be displayed in response to selection of a visualization link associated with the decision-specific visualization. The method may further comprise generating a decision-specific visualization associated with a unique decision step in response to selection of a visualization link associated with the unique decision step. The method may further comprise arranging, by the processor, the decisions on the summary visualization in the order in which the decisions were made during the order allocation process. A first decision-specific visualization may include a visualization link to a decision-specific visualization associated with an immediately preceding decision step and a visualization link to a decision-specific visualization associated with an immediately following decision step. The method may further comprise storing the data items in a cache and wherein the generating, by the processor using the retrieved data items, a visualization may comprise retrieving the data items from the cache.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer-implemented method for providing a graphical display of past decisions made, in a completed order allocation process, to identify inventory at a specific location from a plurality of potential locations for filling an order, the method comprising:

creating a database for storing past decisions made to identify inventory at a specific location from a plurality of potential locations for filling an order;

asynchronously recording in the database inventory level, geographical considerations, and rules defined by a merchant regarding each of a plurality of different orders including a first order;

asynchronously recording in the database each of a plurality of decision steps completed in a plurality of order allocation processes for the plurality of orders including a first order allocation process for the first order, wherein the decision steps include determining one or more shipping locations for items in the order;

asynchronously recording in the database a final result for each of the plurality of order allocation processes including a final result from the first order allocation process;

receiving, from a user interface over a network, a request for a graphical display of decision steps made to determine the specific location from the plurality of potential locations from which goods ordered by a customer were allocated to fulfil the first order;

searching through a plurality of data items belonging to a plurality of different orders for data items in the database belonging to the same order;

retrieving, from the database for each of the plurality of decision steps for the first order allocation process, data identifying each rule that had been applied in the past at the decision step, parameters that had been used in the past during rule application at the decision step, and a decision that had been made in the past resulting from rule application at the decision step;

storing in a cache, for each of the plurality of decision steps for the first order allocation process, the retrieved data identifying the rule for the decision step, the parameters for the decision step, and the decision made at the decision step;

generating a unique decision-specific visualization for each of the plurality of decision steps wherein each decision-specific visualization is associated with a unique decision step and includes one or more unique decision step GUI elements configured to identify the decision that had been made in the past at the associated decision step, the rule that had been applied in the past at the associated decision step, and the parameters that had been considered in the past during rule application at the associated decision step;

mapping, for each of the plurality of decision steps, the data stored in the cache that identifies the retrieved rule, the parameters, and the decision made at the decision step to appropriate unique decision step GUI elements for the unique decision-specific visualization generated for the decision step;

retrieving, from the database, the data regarding the final result for the first order allocation process;

storing, in the cache, the retrieved data regarding the final result for the first order allocation process;

generating a result visualization for the final result of the first order allocation process;

mapping, for the final result, the data stored in the cache regarding the final result for the first order allocation process to the result visualization;

generating a summary visualization that includes one or more summary visualization graphical user interface (GUI) elements that summarize the decisions that had been made in the past and the final result and includes a plurality of selectable graphical control elements, each selectable graphical control element, when selected, is configured to cause the selection of one of the plurality of decision-specific visualizations; and signaling the user interface to display the summary visualization including the one or more summary visualization GUI elements that summarize the decisions made in the past to complete the first order allocation process and the plurality of selectable graphical control elements configured to cause the selection of decision-specific visualizations for display.

2. The method of claim 1, wherein the first order allocation process comprises receiving order information from a host business system and one or more of:
prioritizing orders for allocation;
reviewing order attributes or parameters to determine whether an order: must be shipped from one facility; should be filled from one site if possible, but otherwise filled from multiple sites if it cannot be filled from one site; and/or can only be shipped if an entire order is allocated from one or multiple facilities;
reviewing a postal code on a ship-to address for an order to identify pre-determined geographic locations from which inventory can be allocated for the order; and
attempting to allocate from a site that has a highest priority.

3. The method of claim 2, further comprising:
transmitting data items belonging to an order to the database after completing the prioritizing orders for allocation;
transmitting data items belonging to an order to the database after completing the reviewing order attributes or parameters to determine;
transmitting data items belonging to an order to the database after completing the reviewing the postal code; and
transmitting data items belonging to an order to the database after the attempting to allocate from a site that has the highest priority.

4. The method of claim 1, further comprising generating a decision-specific visualization associated with a unique decision step in response to selection of the selectable graphical control element associated with the unique decision step.

5. The method of claim 1, further comprising arranging the one or more summary visualization GUI elements that summarize the decisions made such that the decisions on the summary visualization are displayed in the order in which the decisions were made during the first order allocation process.

6. The method of claim 1, wherein a first decision-specific visualization includes a first selectable graphical control element that when selected causes the decision-specific visualization associated with an immediately preceding decision step to be displayed and a second selectable graphical control element that when selected causes the decision-specific visualization associated with an immediately following decision step to be displayed.

7. A visualization module comprising a processor configured by programming instructions encoded in non-transitory computer readable media, the visualization module configured to:
create a database for storing past decisions made to identify inventory at a specific location from a plurality of potential locations for filling an order;
asynchronously record in the database inventory level, geographical considerations, and rules defined by a merchant regarding each of a plurality of different orders including a first order;
asynchronously record in the database each of a plurality of decision steps completed in a plurality of order allocation processes for the plurality of orders including a first order allocation process for the first order, wherein the decision steps include determining one or more shipping locations for items in the order;
asynchronously record in the database a final result for each of the plurality of order allocation processes including a final result from the first order allocation process;
receive, from a user interface, a request for a graphical display of decision steps made to determine the specific location from the plurality of potential locations from which goods ordered by a customer were allocated to fulfil the first order;
search through a plurality of data items belonging to a plurality of different orders for data items in the database belonging to the same order;
retrieve, from the database for each of the plurality of decision steps for the first order allocation process, data identifying each rule that had been applied in the past at the decision step, parameters that had been used in the past during rule application at the decision step, and a decision that had been made in the past resulting from rule application at the decision step;

store in a cache, for each of the plurality of decision steps for the first order allocation process, the retrieved data identifying the rule for the decision step, the parameters for the decision step, and the decision made at the decision step;

generate a unique decision-specific visualization for each of the plurality of decision steps wherein each decision-specific visualization is associated with a unique decision step and includes one or more unique decision step GUI elements configured to identify the decision that had been made in the past at the associated decision step, the rule that had been applied in the past at the associated decision step, and the parameters that had been considered in the past during rule application at the associated decision step;

map, for each of the plurality of decision steps, the data stored in the cache that identifies the retrieved rule, the parameters, and the decision made at the decision step to appropriate unique decision step GUI elements for the unique decision-specific visualization generated for the decision step;

retrieve, from the database, the data regarding the final result for the first order allocation process;

store, in the cache, the retrieved data regarding the final result for the first order allocation process;

generate a result visualization for the final result of the first order allocation process;

map, for the final result, the data stored in the cache regarding the final result for the first order allocation process to the result visualization;

generate a summary visualization that includes one or more summary visualization graphical user interface (GUI) elements that summarize the decisions that had been made in the past and the final result and includes a plurality of selectable graphical control elements, each selectable graphical control element, when selected, is configured to cause the selection of one of the plurality of decision-specific visualizations; and signal the user interface to display the summary visualization including the one or more summary visualization GUI elements that summarize the decisions made in the past to complete the first order allocation process and the plurality of selectable graphical control elements configured to cause the selection of decision-specific visualizations for display.

8. The visualization module of claim 7, wherein the first order allocation process comprises receiving order information from a host business system and one or more of:

prioritizing orders for allocation;

reviewing order attributes or parameters to determine whether an order: must be shipped from one facility; should be filled from one site if possible, but otherwise filled from multiple sites if it cannot be filled from one site; and/or can only be shipped if an entire order is allocated from one or multiple facilities;

reviewing a postal code on a ship-to address for an order to identify pre-determined geographic locations from which inventory can be allocated for the order; and attempting to allocate from a site that has a highest priority.

9. The visualization module of claim 8, further configured to:

transmit data items belonging to an order to the database after completing the prioritizing orders for allocation;

transmit data items belonging to an order to the database after completing the reviewing order attributes or parameters to determine;

transmit data items belonging to an order to the database after completing the reviewing the postal code; and transmit data items belonging to an order to the database after the attempting to allocate from a site that has the highest priority.

10. The visualization module of claim 7, further configured to generate a decision-specific visualization associated with a unique decision step in response to selection of the selectable graphical control element associated with the unique decision step.

11. The visualization module of claim 7, further configured to arrange the one or more summary visualization GUI elements that summarize the decisions made such that the decisions on the summary visualization are displayed in the order in which the decisions were made during the first order allocation process.

12. The visualization module of claim 7, wherein a first decision-specific visualization includes a first selectable graphical control element that when selected causes the decision-specific visualization associated with an immediately preceding decision step to be displayed and a second selectable graphical control element that when selected causes the decision-specific visualization associated with an immediately following decision step to be displayed.

13. A non-transitory computer readable storage medium embodying programming instructions configurable to cause a processor to perform a method, the method comprising:

creating a database for storing past decisions made to identify inventory at a specific location from a plurality of potential locations for filling an order;

asynchronously recording in the database inventory level, geographical considerations, and rules defined by a merchant regarding each of a plurality of different orders including a first order;

asynchronously recording in the database each of a plurality of decision steps completed in a plurality of order allocation processes for the plurality of orders including a first order allocation process for the first order, wherein the decision steps include determining one or more shipping locations for items in the order;

asynchronously recording in the database a final result for each of the plurality of order allocation processes including a final result from the first order allocation process;

receiving, from a user interface over a network, a request for a graphical display of decision steps made in the past in a completed order allocation process that was completed in the past to determine the specific location from the plurality of potential locations from which goods ordered by a customer were allocated from to fulfil an order;

retrieving, from the database for each of the plurality of decision steps for the first order allocation process, data identifying each rule that had been applied in the past at the decision step, parameters that had been used in the past during rule application at the decision step, and a decision that had been made in the past resulting from rule application at the decision step;

storing in a cache, for each of the plurality of decision steps for the first order allocation process, the retrieved data identifying the rule for the decision step, the parameters for the decision step, and the decision made at the decision step;

generating a unique decision-specific visualization for each of the plurality of decision steps wherein each decision-specific visualization is associated with a unique decision step and includes one or more unique decision step GUI elements configured to identify the decision that had been made in the past at the associated decision step, the rule that had been applied in the past at the associated decision step, and the parameters that had been considered in the past during rule application at the associated decision step;

mapping, for each of the plurality of decision steps, the data stored in the cache that identifies the retrieved rule, the parameters, and the decision made at the decision step to appropriate unique decision step GUI elements for the unique decision-specific visualization generated for the decision step;

retrieving, from the database, the data regarding the final result for the first order allocation process;

storing, in the cache, the retrieved data regarding the final result for the first order allocation process;

generating a result visualization for the final result of the first order allocation process;

mapping, for the final result, the data stored in the cache regarding the final result for the first order allocation process to the result visualization;

generating a summary visualization that includes one or more summary visualization graphical user interface (GUI) elements that summarize the decisions that had been made in the past and the final result and includes a plurality of selectable graphical control elements, each selectable graphical control element, when selected, is configured to cause the selection of one of plurality of decision-specific visualizations; and signaling the user interface to display the summary visualization including the one or more summary visualization GUI elements that summarize the decisions made in the past to complete the first order allocation process and the plurality of selectable graphical control elements configured to cause the selection of decision-specific visualizations for display.

14. The non-transitory computer readable storage medium of claim 13 wherein the first order allocation process comprises receiving order information from a host business system and one or more of:

prioritizing orders for allocation;

reviewing order attributes or parameters to determine whether an order: must be shipped from one facility; should be filled from one site if possible, but otherwise filled from multiple sites if it cannot be filled from one site; and/or can only be shipped if an entire order is allocated from one or multiple facilities;

reviewing a postal code on a ship-to address for an order to identify pre-determined geographic locations from which inventory can be allocated for the order; and attempting to allocate from a site that has a highest priority.

15. The non-transitory computer readable storage medium of claim 14 wherein the method further comprises:

transmitting data items belonging to an order to the database after completing the prioritizing orders for allocation;

transmitting data items belonging to an order to the database after completing the reviewing order attributes or parameters to determine;

transmitting data items belonging to an order to the database after completing the reviewing the postal code; and transmitting data items belonging to an order to the database after the attempting to allocate from a site that has the highest priority.

16. The non-transitory computer readable storage medium of claim 13 wherein the method further comprises generating a decision-specific visualization associated with a unique decision step in response to selection of the selectable graphical control element associated with the unique decision step.

17. The non-transitory computer readable storage medium of claim 13 wherein the method further comprises arranging the one or more summary visualization GUI elements that summarize the decisions made such that the decisions on the summary visualization are displayed in the order in which the decisions were made during the first order allocation process.

18. The non-transitory computer readable storage medium of claim 13 wherein a first decision-specific visualization includes a first selectable graphical control element that when selected causes the decision-specific visualization associated with an immediately preceding decision step to be displayed and a second selectable graphical control element that when selected causes the decision-specific visualization associated with an immediately following decision step to be displayed.

* * * * *